US012739949B2

(12) United States Patent
Jeong et al.

(10) Patent No.: US 12,739,949 B2
(45) Date of Patent: Sep. 15, 2026

(54) COOKING APPARATUS

(71) Applicant: Samsung Electronics Co., Ltd., Suwon-si (KR)

(72) Inventors: Sangjin Jeong, Suwon-si (KR); Sangwon Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 733 days.

(21) Appl. No.: 18/158,897

(22) Filed: Jan. 24, 2023

(65) Prior Publication Data

US 2023/0319957 A1 Oct. 5, 2023

Related U.S. Application Data

(63) Continuation of application No. PCT/KR2022/021648, filed on Dec. 29, 2022.

(30) Foreign Application Priority Data

Apr. 1, 2022 (KR) ........................ 10-2022-0041314
Jul. 4, 2022 (KR) ........................ 10-2022-0082154

(51) Int. Cl.
*H05B 6/64* (2006.01)
*H05B 6/80* (2006.01)

(52) U.S. Cl.
CPC ......... *H05B 6/6417* (2013.01); *H05B 6/6435* (2013.01); *H05B 6/80* (2013.01)

(58) Field of Classification Search
CPC . A61K 9/1271; A61L 27/16; B29D 11/00038; B29D 11/00865; H01M 4/32;
(Continued)

(56) References Cited

U.S. PATENT DOCUMENTS 9,834,956 B2 12/2017 Hogan
9,913,322 B2 3/2018 Davies
(Continued)

FOREIGN PATENT DOCUMENTS

CN 1200224 C 5/2005
CN 1664450 A 9/2005
(Continued)

OTHER PUBLICATIONS

International Search Report and Written Opinion of the International Searching Authority dated Apr. 25, 2023, in connection with International Application No. PCT/KR2022/021648, 10 pages.
(Continued)

*Primary Examiner* — Quang T Van

(57) ABSTRACT

A cooking apparatus includes a main body forming a cooking chamber and including a control panel, a door configured to open and close the cooking chamber, an opening and closing device configured to lock and unlock the door in response to the door closing the cooking chamber, and a button rotatably and movably coupled with the control panel to be rotated to a first position and a second position different from the first position. The button is limited in movement in relation to the main body in the first position, and movable in relation to the main body to operate the opening and closing device in the second position.

15 Claims, 19 Drawing Sheets

(58) Field of Classification Search

CPC .... H01M 4/52; Y02E 60/10; Y10T 29/49115; E05C 19/06; E05C 19/10; E05C 3/16; E05C 3/30; F24C 15/022; F24C 7/085; F25B 9/145; F25D 19/006; H05B 6/64; H05B 6/6417; H05B 6/6435; H05B 6/80

USPC .......................... 219/678, 702, 719, 756, 681

See application file for complete search history.

(56) References Cited

U.S. PATENT DOCUMENTS

| | | | | |
|---|---|---|---|---|
| 2005/0194380 | A1 | 9/2005 | Ho Kim et al. | |
| 2010/0193507 | A1* | 8/2010 | Zimmer ............... | H05B 6/6485 219/681 |
| 2010/0282742 | A1* | 11/2010 | Uchiyama ............ | H05B 6/6402 219/702 |
| 2020/0146115 | A1 | 5/2020 | Joo et al. | |
| 2021/0239322 | A1 | 8/2021 | Bang et al. | |
| 2021/0278090 | A1 | 9/2021 | Ham et al. | |

FOREIGN PATENT DOCUMENTS

| | | | |
|---|---|---|---|
| CN | 101545340 | B | 1/2012 |
| EP | 1453361 | B1 | 12/2005 |
| GB | 2344881 | A | 6/2000 |
| JP | S53-90040 | A | 8/1978 |
| JP | 2011-506900 | A | 3/2011 |
| KR | 10-1995-0014741 | A | 6/1995 |
| KR | 10-1996-0004842 | B1 | 4/1996 |
| KR | 20-1999-0010889 | U | 3/1999 |
| KR | 10-1999-0039971 | A | 6/1999 |
| KR | 10-1999-0058211 | A | 7/1999 |
| KR | 20-0162052 | Y1 | 12/1999 |
| KR | 20-0178149 | Y1 | 6/2000 |
| KR | 10-2004-0077380 | A | 9/2004 |
| KR | 10-2005-0108248 | A | 11/2005 |
| KR | 10-0534541 | B1 | 12/2005 |
| KR | 10-0751782 | B1 | 8/2007 |
| KR | 10-2007-0103247 | A | 10/2007 |
| KR | 10-2008-0057733 | A | 6/2008 |
| KR | 20-2011-0006105 | U | 6/2011 |
| KR | 10-2019-0138070 | A | 12/2019 |
| KR | 10-2020-0009929 | A | 1/2020 |

OTHER PUBLICATIONS

Invitation pursuant to Rule 63(1) EPC dated Feb. 3, 2025, in connection with European Application No. 22935924.5, 3 pages.

Supplementary European Search Report dated May 22, 2025, in connection with European Application No. 22935924.5, 10 pages.

Notice of Ground for Rejection dated Dec. 9, 2025, in connection with Korean Application No. 10-2022-0082154, 12 pages.

Office Action dated Jun. 8, 2026, in connection with European Application No. 22 935 924.5, 6 pages.

Office Action dated Jun. 15, 2026, in connection with Indian Application No. 202417030863, 7 pages.

* cited by examiner

COOKING APPARATUS

CROSS-REFERENCE TO RELATED APPLICATIONS

This application is a Bypass Continuation of International Application No. PCT/KR2022/021648, filed Dec. 29, 2022, which claims priority to Korea Patent Application No. 10-2022-0041314, filed Apr. 1, 2022, and Korea Patent Application No. 10-2022-0082154, filed Jul. 4, 2022, the disclosures of which are herein incorporated by reference in their entirety.

BACKGROUND

1. Field

The disclosure relates to a cooking apparatus having a door.

2. Description of Related Art

Cooking apparatuses are devices for cooking foods by heating, which provide various functions related to cooking, such as heating, thawing, drying, and sterilizing of an object to be cooked. The cooking apparatuses may include, for example, ovens such as gas ovens or electric ovens, microwave heating devices (also referred to as microwaves), gas ranges, electric ranges, over the ranges (OTRs), gas grills or electric grills.

The microwave is a device for cooking food with frictional heat produced by disturbing the arrangement of water molecules in the food through electromagnetic waves, and the oven is a device for cooking food by transferring heat directly to the food or heating the inside of the cooking chamber by means of a heating source that produces heat, such as a heater.

The cooking chamber may be opened and closed by a door. The cooking apparatus may include an opening and closing device to selectively lock the door so that the door maintains a state of closing the cooking chamber. The user may unlock the door by manipulating the opening and closing device and then open the door.

SUMMARY

An embodiment of the disclosure provides a cooking apparatus with increased safety of use.

Technological objectives of the disclosure are not limited to what are mentioned above, and throughout the specification, it will be clearly appreciated by those of ordinary skill in the art that there may be other technological objectives unmentioned.

According to an aspect of the disclosure, a cooking apparatus includes a main body forming a cooking chamber and including a control panel, a door configured to open and close the cooking chamber, an opening and closing device configured to lock and unlock the door in response to the door closing the cooking chamber, and a button rotatably and movably coupled with the control panel to be rotated to a first position and a second position different from the first position. The button may be limited in movement in relation to the control panel in the first position, and movable in relation to the control panel to operate the opening and closing device in the second position.

The cooking apparatus may further include an elastic body configured to apply torsion to the button in a rotational direction in which the button is rotated from the second position to the first position.

The elastic body may be configured to apply an elastic force to the button in a movable direction in which the button protrudes from the control panel.

The button may include a button fixer configured to fix a first end of the elastic body. The control panel may include a panel fixer configured to fix a second end opposite from the first end of the elastic body.

The button may include an elastic body guide configured to support at least a portion of the elastic body to prevent the elastic body from extending outside of the button while the elastic body is pressurized and restored.

The control panel may include a spindle support rotatably and movably coupled with a button spindle of the button, the spindle support configured to support at least a portion of the elastic body to prevent the elastic body from extending outside of the control panel while the elastic body pressurized and restored.

The control panel may include a panel interferer protruding toward the button. The button may include a button interferer configured to align with the panel interferer in response to the button rotating to the first position, and not align with the panel interferer in response to the button rotating to the second position.

The button may include a button spindle forming a rotational axis of the button and a button pusher spaced apart from the button spindle and configured to push the opening and closing device. The control panel may include a pusher guide configured to guide movement of the button pusher caused by rotation of the button.

The pusher guide may be configured to support the button pusher in response to the button rotating to the first position.

The pusher guide may be configured to interfere with the button pusher to limit rotation of the button in a direction opposite from a direction toward the first position from the second position.

The button may include a button coupler supported on the control panel to limit movement of the button mounted on the control panel in a movable direction in which the button protrudes from the control panel. The control panel may include a coupler guide configured to guide movement of the button coupler caused by rotation of the button.

The coupler guide may be configured to support the button coupler in response to the button rotating to the first position.

The coupler guide may be configured to interfere with the button coupler to limit rotation of the button in a direction opposite from a direction toward the first position from the second position.

The control panel may include a button mounting portion formed for the button to be mounted therein. The button may include a button body placed inside the button mounting portion, and an exposed portion positioned inside or outside the button mounting portion and having a cross-section orthogonal to a movable direction of the button smaller than a cross-section of the button body orthogonal to the movable direction of the button.

The button may include a button spindle forming a rotational axis of the button and configured to push the opening and closing device.

According to an aspect of the disclosure, a cooking apparatus includes a main body having a cooking chamber, a door configured to open and close the cooking chamber, an opening and closing device configured to lock and unlock the door in response to the door closing the cooking chamber, a button rotatably and movably coupled with the main body to be rotated to a first position to limit movement in relation to the main body and a second position allowing the button to be movable in relation to the main body, and an elastic body configured to apply elastic force to the button in a movable direction in which the button protrudes from the main body.

The elastic body may be configured to apply torsion to the button in a rotational direction in which the button is rotated from the second position to the first position.

The main body may include a panel interferer protruding toward the button. The button may include a button interferer configured to align with the panel interferer in response to the button rotating to the first position, and not align with the panel interferer in response to the button rotating to the second position.

The button may include a button fixer arranged on the button interferer to fix a first end of the elastic body. The main body may include a panel fixer arranged on the panel interferer to fix a second end opposite from the first end of the elastic body.

The button may include an elastic body guide configured to support the elastic body from outside of the elastic body to prevent the elastic body from extending outside the button while the elastic body is pressurized and restored. The main body may include a spindle support rotationally and movably coupled with a button spindle of the button, the spindle support configured to support the elastic body from inside of the elastic body to prevent the elastic body from extending outside of the main body while the elastic body is pressurized and restored.

According to embodiments of the disclosure, a cooking apparatus may be configured to unlock a door by rotating and then pressurizing a button, thereby having increased safety of use.

Effects according to the disclosure are not limited thereto, and throughout the specification it will be clearly appreciated by those of ordinary skill in the art that there may be other effects unmentioned.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
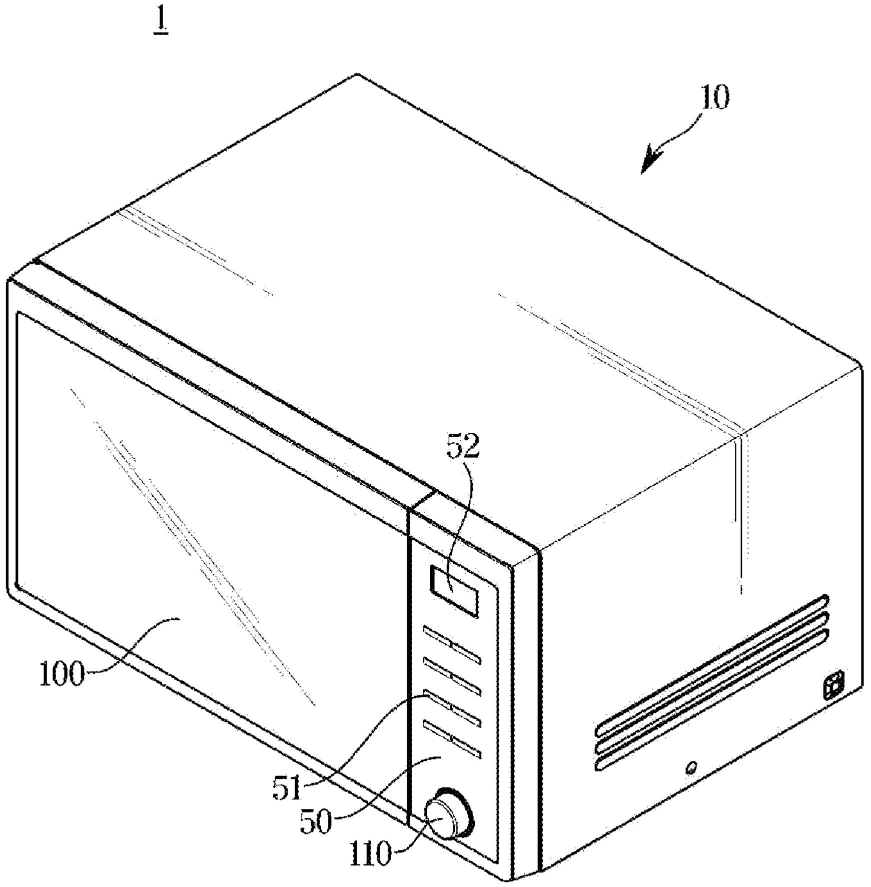
FIG. 1 illustrates a cooking apparatus, according to an embodiment of the disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It is understood that various embodiments of the disclosure and associated terms are not intended to limit technical features herein to particular embodiments, but encompass various changes, equivalents, or substitutions.

Like reference numerals may be used for like or related elements throughout the drawings.

The singular form of a noun corresponding to an item may include one or more items unless the context states otherwise.

Throughout the specification, "A or B", "at least one of A and B", "at least one of A or B", "A, B or C", "at least one of A, B and C", and "A, B, or C" may each include any one or all the possible combinations of A, B and C.

The expression "and/or" is interpreted to include a combination or any of associated elements.

Terms like "first", "second", etc., may be simply used to distinguish an element from another, without limiting the elements in a certain sense (e.g., in terms of importance or order).

When an element is mentioned as being "coupled" or "connected" to another element with or without an adverb "functionally" or "operatively", it means that the element may be connected to the other element directly (e.g., wiredly), wirelessly, or through a third element.

It will be further understood that the terms "comprise" and/or "comprising," when used in this specification, specify the presence of stated features, integers, steps, operations, elements, parts or combinations thereof, but do not preclude the possible presence or addition of one or more other features, integers, steps, operations, elements, components, and/or groups thereof.

When an element is mentioned as being "connected to", "coupled to", "supported on" or "contacting" another element, it includes not only a case that the elements are directly connected to, coupled to, supported on or contact each other but also a case that the elements are connected to, coupled to, supported on or contact each other through a third element.

Throughout the specification, when an element is mentioned as being located "on" another element, it implies not only that the element is abut on the other element but also that a third element exists between the two elements.

A cooking apparatus according to various embodiments of the disclosure will now be described in detail in connection with the accompanying drawings.

Figure 2:
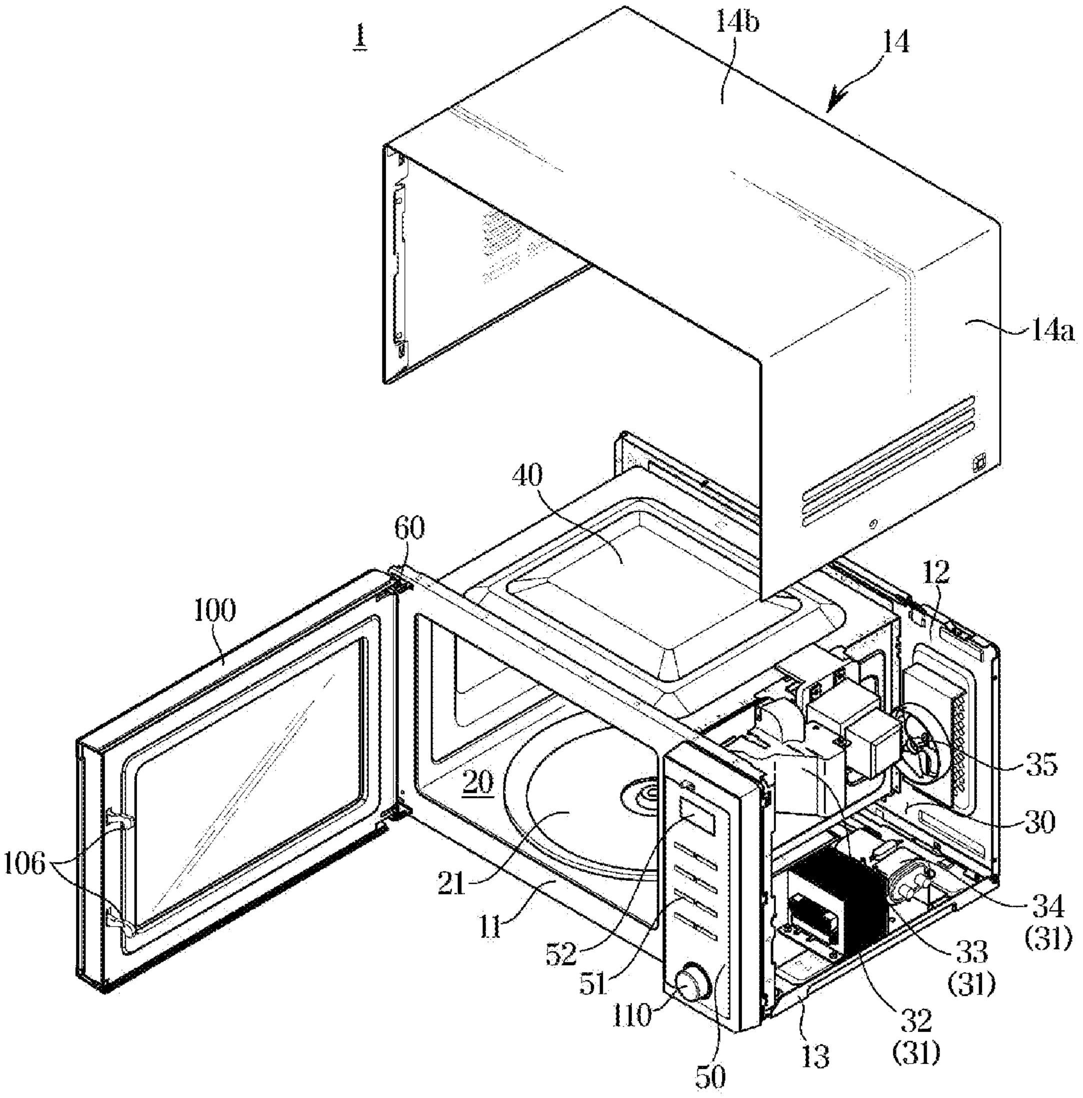
FIG. 2 is an exploded view of part of the cooking apparatus shown in FIG. 1.

FIG. 1 illustrates a cooking apparatus, according to an embodiment of the disclosure. FIG. 2 illustrates the interior of the cooking apparatus shown in FIG. 1.

Referring to FIGS. 1 and 2, the cooking apparatus 1 may include a main body 10 forming an exterior of the cooking apparatus 1. The main body 10 may include a front panel 11, a rear panel 12, a bottom panel 13 and a cover 14. The cover 14 may be arranged between the front panel 11 and the rear panel 12. The cover 14 may include a side panel 14*a* and a top panel 14*b*. The side panel 14*a* and the top panel 14*b* may be integrally formed in one body. Alternatively, the side panel 14*a* and the top panel 14*b* may be separately formed.

The cooking apparatus 1 may include an inner case 40 that forms a cooking chamber 20. The inner case 40 may be arranged inside the main body 10. The inner case 40 may be substantially shaped like a rectangular parallelepiped. An electric room 30 may be formed between the main body 10 and the inner case 40.

The cooking apparatus 1 may include a heating source 31 for cooking an object to be cooked. For example, the heating source 31 may include a magnetron 32 provided to generate high frequency waves to be supplied into the cooking chamber 20, a high-voltage transformer 33 for applying a high voltage to the magnetron 32, and a high-voltage condenser 34. The magnetron 32, the high-voltage transformer 33 and the high-voltage condenser 34 may be placed in the electric room 30. The cooking apparatus 1 may include a cooling fan 35 for cooling components in the electric room 30. The cooling fan 35 may be located in the electric room 30.

The cooking apparatus 1 may include a tray 21 arranged in the cooking chamber 20 to receive an object to be cooked.

The cooking apparatus 1 may include a waveguide provided to guide the high frequency waves radiated from the magnetron 32 into the cooking chamber 20.

The cooking apparatus 1 may cook the object received on the tray 21 as the high frequency waves radiate into the cooking chamber 20. The cooking apparatus 1 may cook the object with frictional heat between molecules produced from repetitive changes in arrangement of water molecules contained in the object received on the tray 21 by radiating high-frequency waves into the cooking chamber 20.

For example, the heating source 31 may include a heater to heat the inside of the cooking chamber 20.

The cooking apparatus 1 may include a door 100 coupled with the front panel 11 of the main body 10 to open or close the cooking chamber 20. The door 100 may be rotatably coupled with the main body 10. At least a portion of the door 100 may be formed of a transparent or translucent material to allow the interior of the cooking chamber 20 to be seen through the portion.

The cooking apparatus 1 may include a control panel 50 including an input 51 for receiving an input from the user and/or a display 52 for displaying information. The control panel 50 may be coupled to the front panel 11 of the main body 10. The control panel 50 may be placed on a side of the door 100. The control panel 50 may be located on an end opposite of the front panel 11 from a hinge 60 that rotatably supports the door 100 is located. The control panel 50 may be a component included in the main body 10.

The cooking apparatus 1 may include a button 110 mounted on the control panel 50. The cooking apparatus 1 may be configured to open the door 100 as the button 110 is manipulated when the door 100 is in a closed position to enclose the cooking chamber 20.

Figure 3:
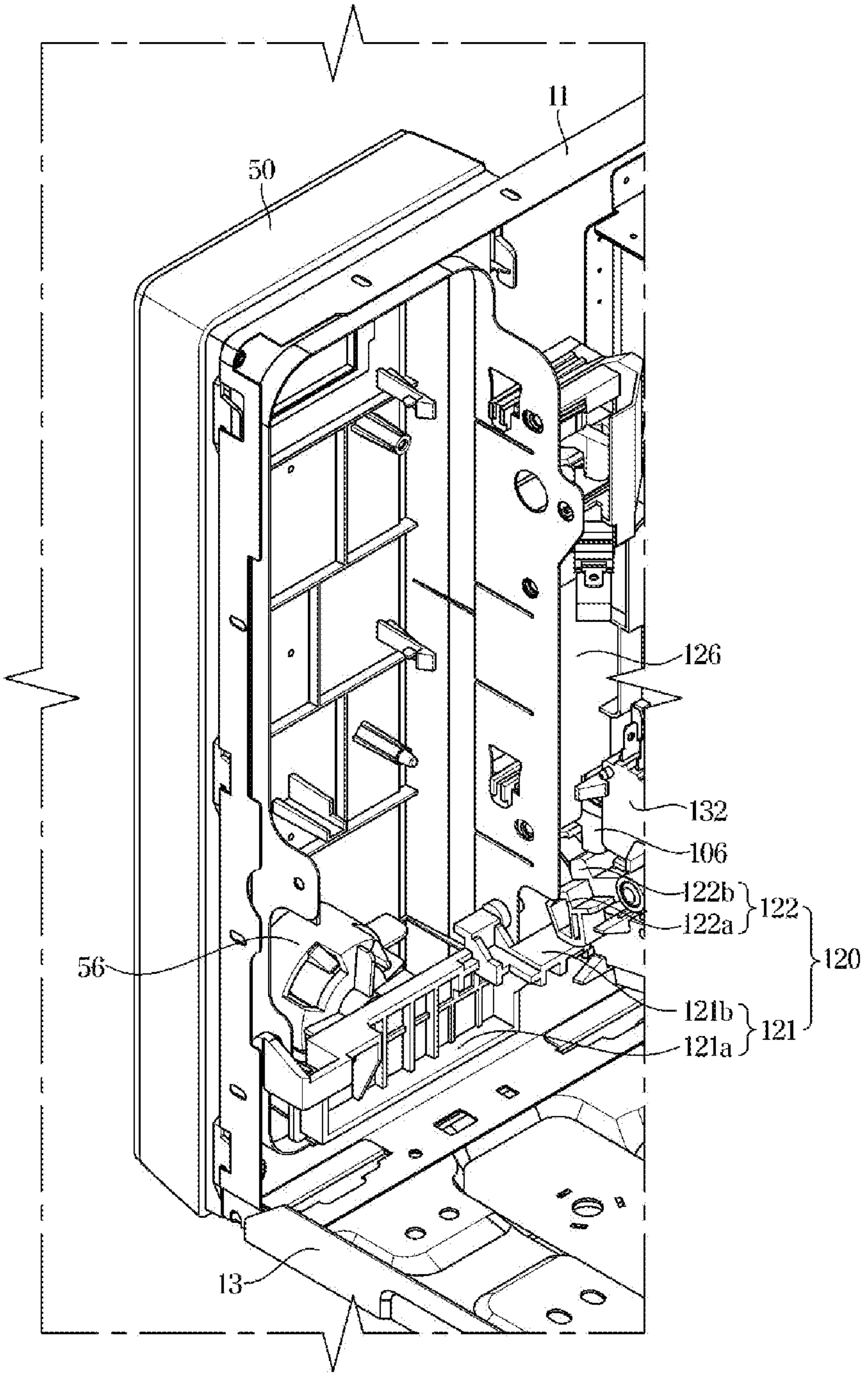
FIG. 3 illustrates a door lock device arranged in the cooking apparatus shown in FIG. 1.
Figure 4:
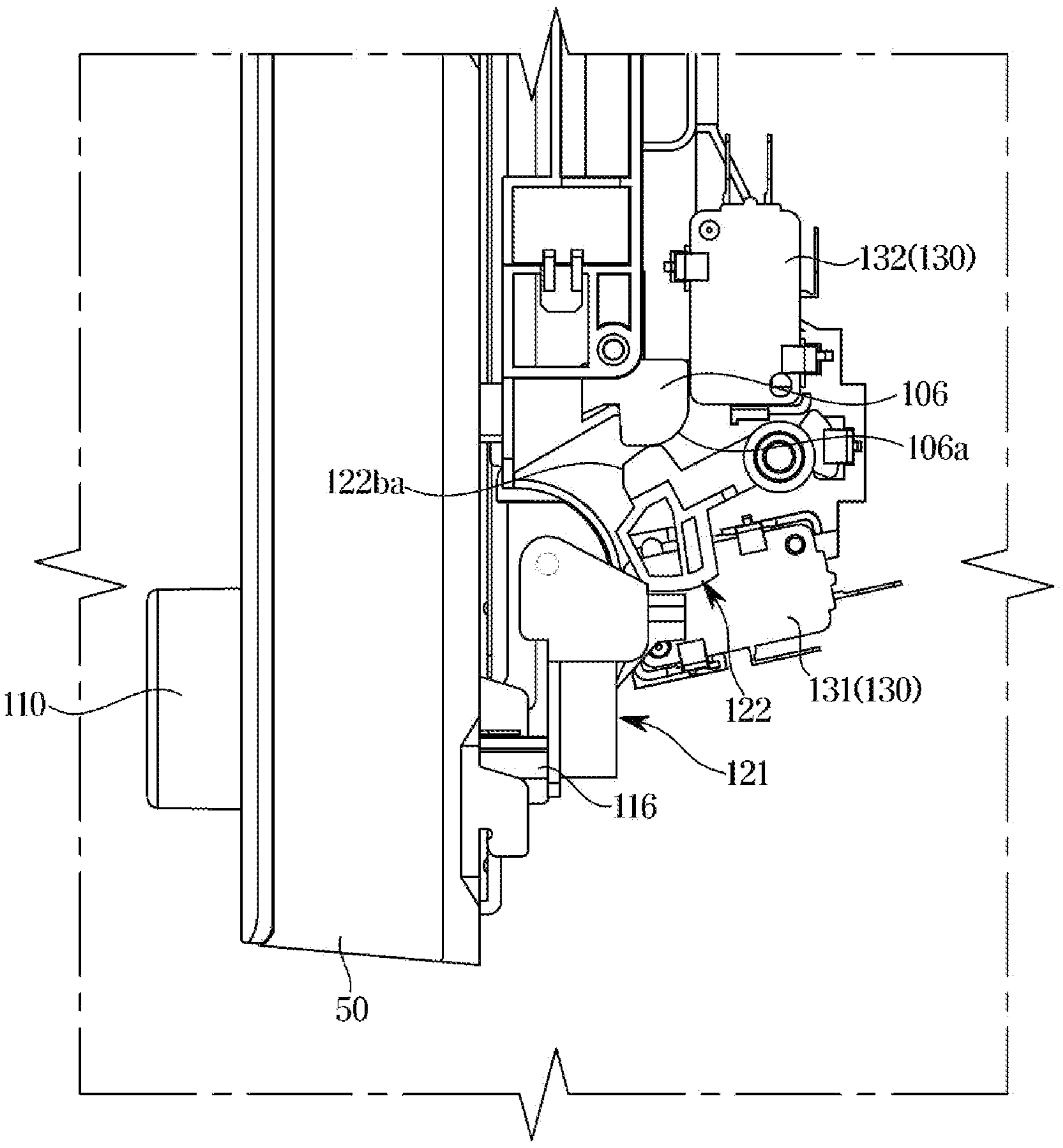
FIG. 4 illustrates a state of the door lock device shown in FIG. 3 locking a door.
Figure 5:
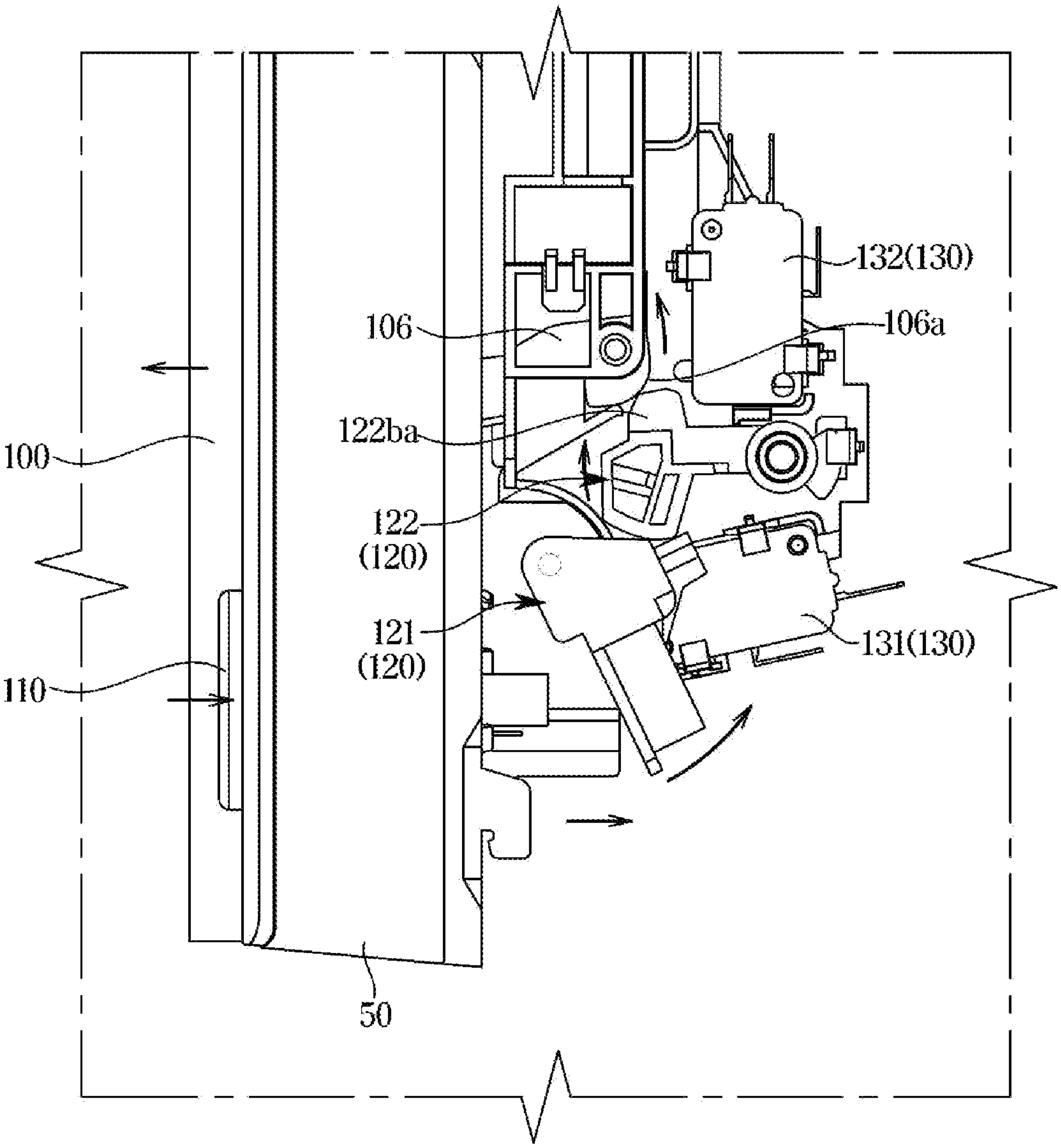
FIG. 5 illustrates a state of the door lock device shown in FIG. 3 unlocking the door.
Figure 6:
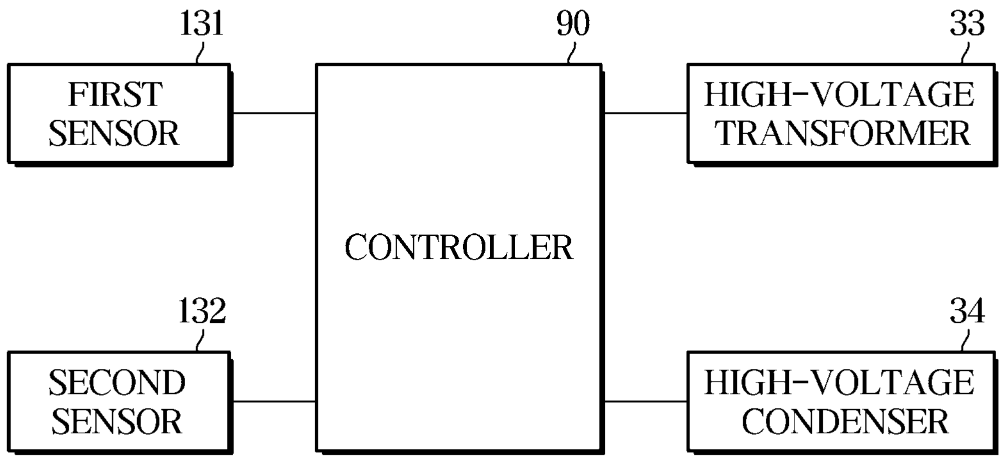
FIG. 6 illustrates connections of a controller for controlling a heating source shown in FIG. 2 based on information detected by a sensor shown in FIGS. 4 and 5.

FIG. 3 illustrates a door lock device arranged in the cooking apparatus shown in FIG. 1. FIG. 4 illustrates a state of the door lock device shown in FIG. 3 locking a door. FIG. 5 illustrates a state of the door lock device shown in FIG. 3 unlocking the door. FIG. 6 illustrates connections of a controller for controlling the heating source shown in FIG. 2 based on information detected by a sensor shown in FIGS. 4 and 5.

Referring to FIGS. 3 to 6, structures of the button 110 and an opening and closing device 120 for opening the door 100 will be described.

The cooking apparatus 1 may include the button 110 to operate the opening and closing device 120. The control panel 50 may include a button mounting portion 56 in which the button 110 is mounted. The button 110 may be movably mounted in the button mounting portion 56.

The cooking apparatus 1 may include the opening and closing device 120 arranged to selectively limit movement of the door 100 when the door 100 is in the position to close the cooking chamber 20. The cooking apparatus 1 may include a door latch 106 movably mounted on the door 100. The opening and closing device 120 may be arranged to move the door latch 106.

The opening and closing device 120 may include a first transfer member 121 arranged to be rotated when pressurized by the button 110, and a second transfer member 122 arranged to be rotated when the first transfer member 121 is rotated.

The first transfer member 121 may be rotatably mounted on the front panel 11. The first transfer member 121 may be rotatably mounted on the control panel 50. The first transfer member 121 may be arranged to rotate the second transfer member 122 when pressurized and rotated by a button pusher 116 of the button 110.

The first transfer member 121 may include a first transferer 121*a* arranged to be pressurized by the button 110, and a first pusher 121*b* arranged to rotate the second transfer member 122. The first transfer member 121 may be rotated when the first transferer 121*a* is pressurized by the button 110, so that the first pusher 121*b* rotates the second transfer member 122. The first transferer 121*a* may be arranged to come into contact with the button 110. The first pusher 121*b* may be arranged to come into contact with the second transfer member 122.

The second transfer member 122 may be rotationally mounted on the front panel 11. The second transfer member 122 may be rotationally mounted on a case 126 of the opening and closing device 120 mounted on the front panel 11. The second transfer member 122 may move the door latch 106 to open the door 100 when rotated by the first transfer member 121.

The second transfer member 122 may include a second transferer 122*a* arranged to be pressurized by the first transfer member 121, and a second pusher 122*b* arranged to move the door latch 106. The second transfer member 122 may be rotated when the second transferer 122*a* is pressurized by the first transfer member 121, so that the second pusher 122*b* moves the door latch 106. The second transferer 122*a* may be arranged to come into contact with the first pusher 121*b* of the first transfer member 121. The second pusher 122*b* may be arranged to come into contact with the door latch 106.

The second pusher 122*b* of the second transfer member 122 may include a push plane 122*ba* formed to move the door latch 106 in a direction of opening the door 100 when the first transfer member 121 and the second transfer member 122 are rotated as the button 110 is pressurized. The push plane 122*ba* may have the form of a curved plane swollen toward the door latch 106. The push plane 122*ba* may be formed to not only lift the door latch 106 but also push the door latch 106 in a direction of opening the door 100 when the first transfer member 121 is rotated as the button is pressurized. As the push plane 122*ba* pushes the door latch 106, the door 100 may be opened as much as the user is able to hold the door 100.

The door latch 106 may include a guide plane 106*a* arranged to come into contact with the push plane 122*ba* of the second pusher 122*b* of the second transfer member 122. The guide plane 106*a* may be pressurized by the push plane 122*ba* in the direction of opening the door 100 when the first transfer member 121 and the second transfer member 122 are rotated as the button 110 is pressurized. The guide plane 106*a* may have the form of a curved plane swollen toward the second transfer member 122.

Referring to FIG. 6, the cooking apparatus 1 may include sensors 130. The sensors 130 may include a first sensor 131 and/or a second sensor 132. The first sensor 131 may be arranged to come into contact with the second transfer member 122. The second sensor 132 may be arranged to come into contact with the door latch 106. The first sensor 131 may send the controller 90 a signal to stop operation of the heating source 31 when disconnected and separated from the second transfer member 122 as the second transfer member 122 is rotated. The second sensor 132 may send the controller 90 a signal to stop operation of the heating source 31 when disconnected and separated from the door latch 106 as the door latch 106 is moved. The controller 90 may be configured to control a high-voltage transformer 33 and/or a high-voltage condenser 34.

Figure 7:
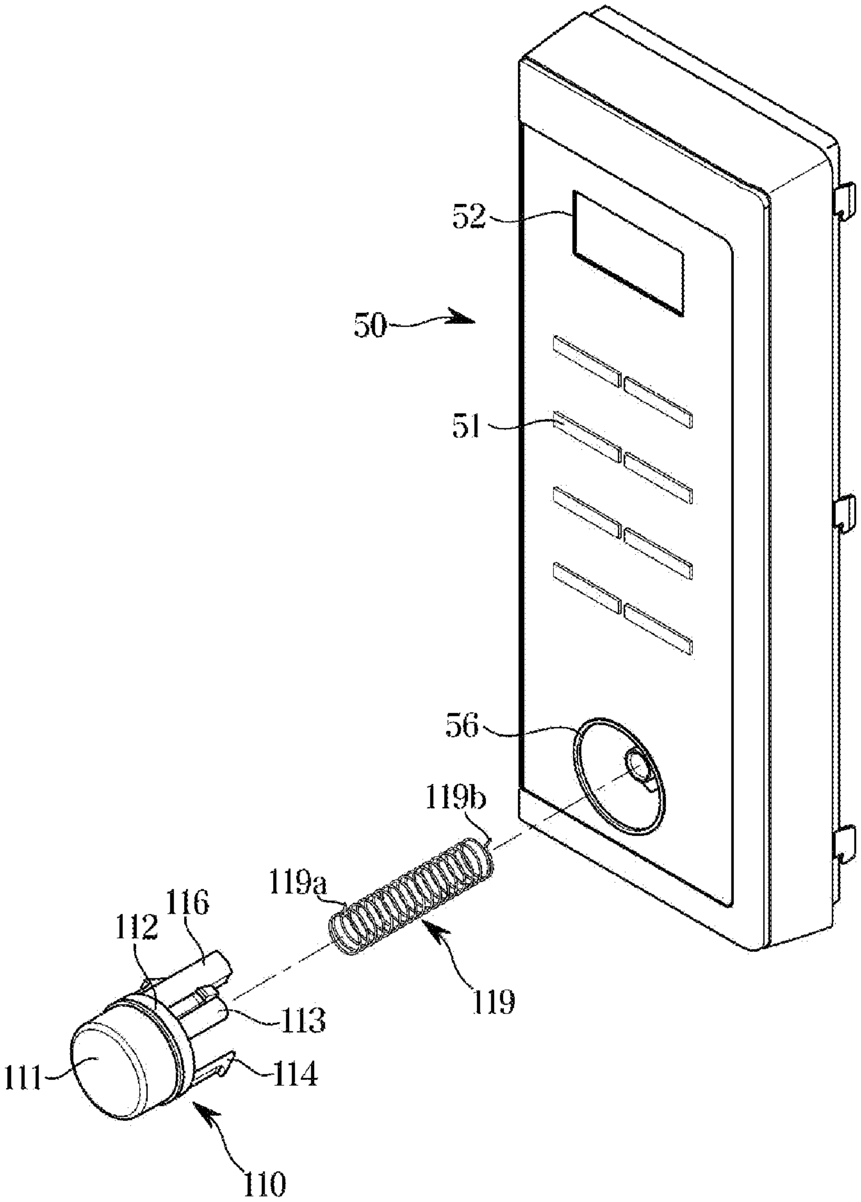
FIG. 7 is an exploded view of a button from a control panel shown in FIG. 1.
Figure 8:
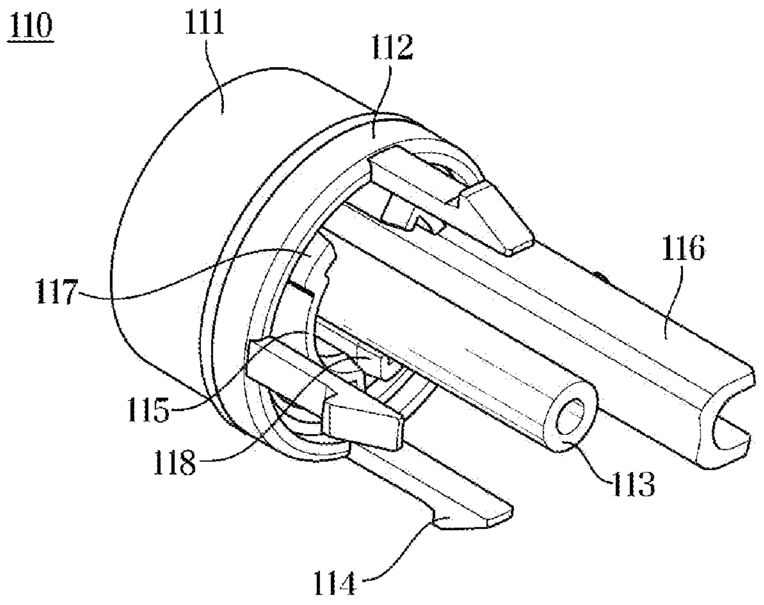
FIG. 8 illustrates the button shown in FIG. 7.
Figure 9:
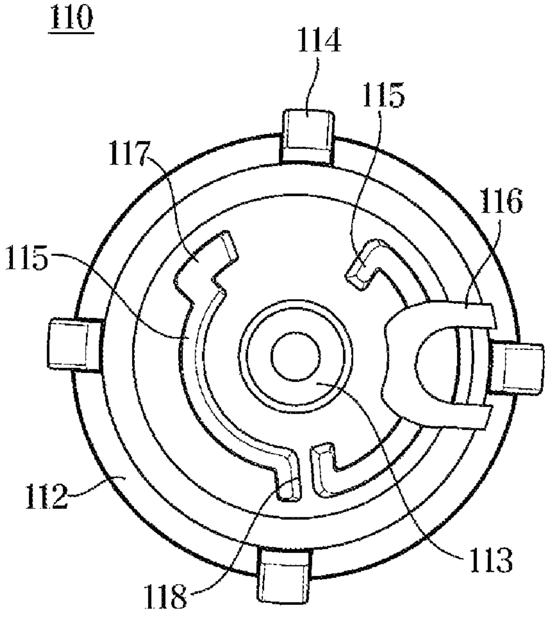
FIG. 9 illustrates an interior of the button shown in FIG. 8.
Figure 10:
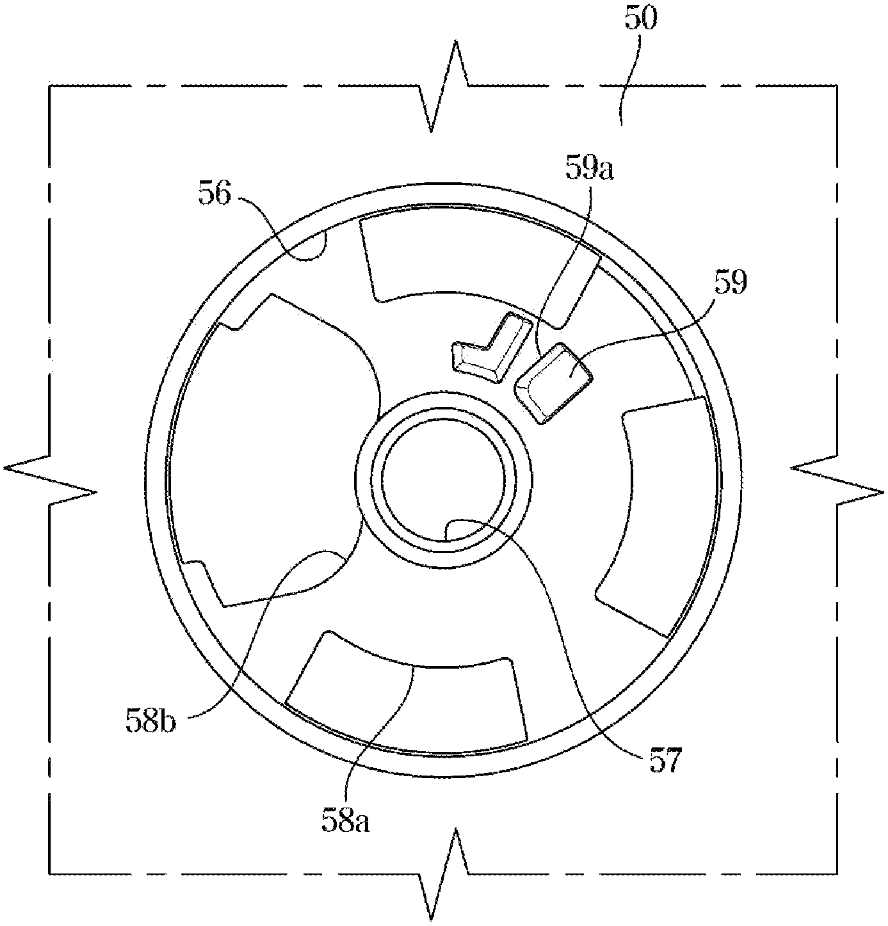
FIG. 10 illustrates an interior of a button mounting portion shown in FIG. 7.

FIG. 7 is an exploded view of the button separated from the control panel shown in FIG. 1. FIG. 8 illustrates the button shown in FIG. 7. FIG. 9 illustrates an interior of the button shown in FIG. 8. FIG. 10 illustrates an interior of the button mounting portion shown in FIG. 7.

Referring to FIGS. 7 to 10, the button 110 and the button mounting portion 56 of the cooking apparatus 1 will be described in an embodiment of the disclosure.

Referring to FIGS. 7 to 9, the button 110 may include a button body 112. The button body 112 may have a substantially cylindrical shape. The button body 112 may be provided in a shape and/or size corresponding to the button mounting portion 56. The button body 112 may be movably arranged inside the button mounting portion 56. The button body 112 may be rotationally arranged in the button mounting portion 56.

The button 110 may include an exposed portion 111 arranged on one side of the button body 112. The exposed portion 111 may extend from the button body 112 to one side. The exposed portion 111 may protrude forward from the button body 112. The exposed portion 111 may have a substantially cylindrical shape. The exposed portion 111 may be arranged to be exposed to the outside of the control panel 50 before the button 110 is pressurized.

The exposed portion 111 may have a smaller size than the button body 112. The size of a cross-section of the exposed portion 111 perpendicular to a direction in which the button 110 is mounted in the button mounting portion 56 may be set to be smaller than the size of a cross-section of the button body 112 perpendicular to the direction in which the button 110 is mounted in the button mounting portion 56. The size of the cross-section of the exposed portion 111 perpendicular to the direction in which the button 110 is mounted in the button mounting portion 56 may be set to be smaller than the size of a cross-section of the button mounting portion 56 perpendicular to the direction in which the button 110 is mounted in the button mounting portion 56. Hence, the exposed portion 111 may be spaced apart from the button mounting portion 56 when the button 110 is pressurized and positioned inside the button mounting portion 56. As the exposed portion 111 is arranged to be spaced apart from the button mounting portion 56 when positioned inside the button mounting portion 56, the exposed portion 111 and the button mounting portion 56 may be prevented from being damaged by mutual friction.

The button 110 may include a button spindle 113 extending in a direction in which the button 110 is coupled with the button mounting portion 56. The button spindle 113 may extend in a direction in which the button 110 is moved in relation to the control panel 50. The button spindle 113 may have a substantially cylindrical shape. The button spindle 113 may be located almost in the center of the button body 112. The button spindle 113 may be movably coupled with a spindle support 57 of the button mounting portion 56. The button spindle 113 may be rotationally coupled with the spindle support 57 of the button mounting portion 56. The button 110 may be rotationally supported by the button spindle 113 on the control panel 50. The button spindle 113 may be arranged to match the spindle support 57.

The button 110 may include a button coupler 114 extending in a direction in which the button 110 is coupled with the button mounting portion 56. The button coupler 114 may extend in a direction in which the button 110 is moved in relation to the control panel 50. The button coupler 114 may be located on the circumference of the button body 112. The button coupler 114 may be provided in the plural along the circumference of the button body 112.

The button coupler 114 may have a substantially hook shape. The button coupler 114 may include an elastically deformable material. The button coupler 114 may be deformed while the button spindle 113 is coupled with the spindle support 57. The button coupler 114 may be restored by elasticity when the button spindle 113 is mounted in the spindle support 57. The button 110 may be separated from the control panel 50 by deforming the button coupler 114. The button coupler 114 may be supported by a coupler guide 58*a* to prevent the button 110 from leaving the button mounting portion 56 when the button 110 is mounted in the button mounting portion 56. A rotation range of the button 110 may be limited by the coupler guide 58*a* and/or a pusher guide 58*b*.

The button coupler 114 may be coupled with the coupler guide 58*a* of the button mounting portion 56. When the button coupler 114 is mounted on the coupler guide 58*a*, the button coupler 114 may be provided to limit movement of the button 110 in a direction in which the button 110 is separated from the button mounting portion 56. The button coupler 114 may be movably provided in a direction in which the button 110 is pressurized.

The button coupler 114 may be movably mounted on the coupler guide 58*a*. The button coupler 114 may be guided by the coupler guide 58*a* when mounted on the coupler guide 58*a*. The button coupler 114 may be moved inside the coupler guide 58*a* with rotation of the button 110 against the control panel 50 when mounted on the coupler guide 58*a*.

The button 110 may include an elastic body guide 115 arranged to support at least a portion of the elastic body 119 to prevent the elastic body 119 from leaving the button 110 while the elastic body 119 is compressed or restored. The elastic body guide 115 may limit movement of the elastic body 119 to a direction almost perpendicular to the rotational axis of the button 110. The elastic body guide 115 may limit movement of the elastic body 119 to a direction almost perpendicular to a direction in which the elastic body 119 is compressed or restored. The elastic body guide 115 may limit movement of the elastic body 119 with respect to a radial direction of the button 110. The elastic body guide 115 may support the elastic body 119 from outside of the elastic body 119.

The button 110 may include the button pusher 116 to operate the opening and closing device 120. The button pusher 116 may extend in a direction in which the button 110 is coupled with the button mounting portion 56. The button pusher 116 may extend in a direction in which the button 110 is moved in relation to the control panel 50. The button pusher 116 may be located on the circumference of the button body 112. The button pusher 116 may be located between the plurality of button couplers 114 along the circumference of the button body 112. The button pusher 116 may be formed to protrude farther from the button body 112 than the button coupler 114. The button pusher 116 may be provided to be able to pressurize the first transfer member 121 of the opening and closing device 120.

The button pusher 116 may be coupled with the pusher guide 58*b* of the button mounting portion 56. The button pusher 116 may be movably mounted on the pusher guide 58*b*. The button pusher 116 may be guided by the pusher guide 58*b* when mounted on the pusher guide 58*b*. The button pusher 116 may be moved inside the pusher guide 58*b* with rotation of the button 110 against the control panel 50 when mounted on the pusher guide 58*b*.

The button 110 may include a button interferer 117 extending in a direction in which the button 110 is coupled with the button mounting portion 56. The button interferer 117 may extend from the inner surface of the button body 112 toward the control panel 50. The button interferer 117 may be located between the button spindle 113 and the button coupler 114 along a radial direction of the button body 112.

The button interferer 117 may be arranged to align with a panel interferer 59 of the button mounting portion 56 to restrict movement of the button 110. The button interferer 117 may be arranged to align with the panel interferer 59 to not allow the button 110 to move in a direction in which the button 110 is pressurized, when the button 110 is in a non-rotated state against the control panel 50. The button interferer 117 may be arranged to not align with the panel interferer 59 to allow the button 110 to be moved in the direction in which the button 110 is pressurized, when the button 110 is in a rotated state against the control panel 50.

The button 110 may include a button fixer 118 arranged to fix a first end 119*a* of the elastic body 119. The button fixer 118 may have a substantially grooved form. The button fixer 118 may be arranged to move the first end 119*a* of the elastic body 119 when the button 110 is rotated. The button fixer 118 may be formed on the button body 112. The button fixer 118 may be formed on the button interferer 117. The button fixer 118 may be located between the button spindle 113 and the button coupler 114 along the radial direction of the button body 112.

The cooking apparatus 1 may include the elastic body 119 arranged to elastically support the button 110 against the control panel 50. The elastic body 119 may include a spring. The elastic body 119 may have the first end 119*a* fixed to the button fixer 118 of the button 110. A second end 119*b* of the elastic body 119 opposite from the first end 119*a* may be fixed to the panel fixer 59*a* of the button mounting portion 56. The elastic body 119 may be provided to apply elastic force in a direction in which the button 110 is decoupled from the button mounting portion 56. The elastic body 119 may be provided to apply torsion to the button 110 against the button mounting portion 56. The elastic body 119 may be provided to apply torsion to a position at which movement of the button 110 in relation to the control panel 50 is limited.

Referring to FIG. 10, the control panel 50 may include the spindle support 57 arranged in almost the center of the button mounting portion 56. The spindle support 57 may support the button spindle 113 to be movable in a direction in which the button 110 is pressurized. The spindle support 57 may rotationally support the button spindle 113 of the button 110. The spindle support 57 may have a substantially cylindrical shape. The button spindle 113 may be inserted to the spindle support 57.

The spindle support 57 of the control panel 50 may be provided to support at least a portion of the elastic body 119 to prevent the elastic body 119 from leaving the control panel 50 while the elastic body 119 is compressed or restored. The spindle support 57 may limit movement of the elastic body 119 in a direction almost perpendicular to the rotational axis of the button 110. The spindle support 57 may limit movement of the elastic body 119 in a direction almost perpendicular to a direction in which the elastic body 119 is compressed or restored. The spindle support 57 may limit movement of the elastic body 119 with respect to a radial direction of the button 110. The spindle support 57 may support the elastic body 119 from inside o" the' elastic body 119.

The control panel 50 may include the coupler guide 58*a* arranged almost on the circumference of the button mounting portion 56. The coupler guide 58*a* may movably support the button coupler 114. The coupler guide 58*a* may guide forward or backward movement of the button coupler 114. The coupler guide 58*a* may guide the button coupler 114 in a direction in which the button 110 is pressurized. The coupler guide 58*a* may extend along the circumferential direction of the button mounting portion 56. The coupler guide 58*a* may be formed for the button coupler 114 to be moved as far as a rotational range of the button 110 against the control panel 50. The coupler guide 58*a* may support the button coupler 114 to prevent the button 110 from leaving the control panel 50 when coupled with the button coupler 114. There may be as many coupler guides 58*a* as the number of button couplers 114. The coupler guide 58*a* may be provided in the plural on the circumference of the button mounting portion 56 along the circumferential direction of the button mounting portion 56.

The control panel 50 may include the pusher guide 58*b* arranged almost on the circumference of the button mounting portion 56. The pusher guide 58*b* may movably support the button pusher 116. The pusher guide 58*b* may guide forward or backward movement of the button pusher 116. The pusher guide 58*b* may guide the button pusher 116 in a direction in which the button 110 is pressurized. The pusher guide 58*b* may extend along the circumferential direction of the button mounting portion 56. The pusher guide 58*b* may be formed for the button pusher 116 to be moved as far as a rotational range of the button 110 against the control panel 50. The pusher guide 58*b* may be located between the coupler guides 58*a* along the circumferential direction of the button mounting portion 56.

The control panel 50 may include a panel interferer 59 protruding from the inner surface of the button mounting portion 56 toward the button 110. The panel interferer 59 may be located between the spindle support 57 and the coupler guide 58*a* along the radial direction of the button mounting portion 56. The panel interferer 59 may extend in a direction in which the button 110 is mounted on the control panel 50. The panel interferer 59 may extend in a direction of linear movement of the button 110 in relation to the control panel 50.

The panel interferer 59 may be arranged to come into contact with the button interferer 117 when the button 110 is in a state before rotating against the control panel 50. The panel interferer 59 may support the button interferer 117 to prevent the button 110 from moving into the control panel 50 when the button 110 is in a state before rotating against the control panel 50. The panel interferer 59 may be arranged to be spaced apart from the button interferer 117 when the button 110 is in a state of rotating against the control panel 50. The panel interferer 59 may not align or interfere with the button interferer 117 for the button 110 to be moved into the control panel 50 when the button 110 is in a rotated state against the control panel 50.

The control panel 50 may include the panel fixer 59*a* arranged inside the button mounting portion 56. The panel fixer 59*a* may fix the second end 119*b* of the elastic body 119 opposite from the first end 119*a*. The panel fixer 59*a* may have a substantially grooved form. The panel fixer 59*a* may be formed on the panel interferer 59. The panel fixer 59*a* may fix the second end 119*b* to prevent linear movement of the second end 119*b* of the elastic body 119, when the button 110 is rotated. The panel fixer 59*a* may fix the second end 119*b* of the elastic body 119 to prevent movement the second end 119*b* of the elastic body 119 while the button fixer 118 moves the first end 119*a* of the elastic body 119 with rotation of the button 110. Accordingly, the elastic body 119 may apply torsion to the button 110 to a position at which the panel interferer 59 aligns with the button interferer 117. The panel fixer 59*a* may be located between the spindle support 57 and the coupler guide 58*a* along the radial direction of the button mounting portion 56.

Figure 11:
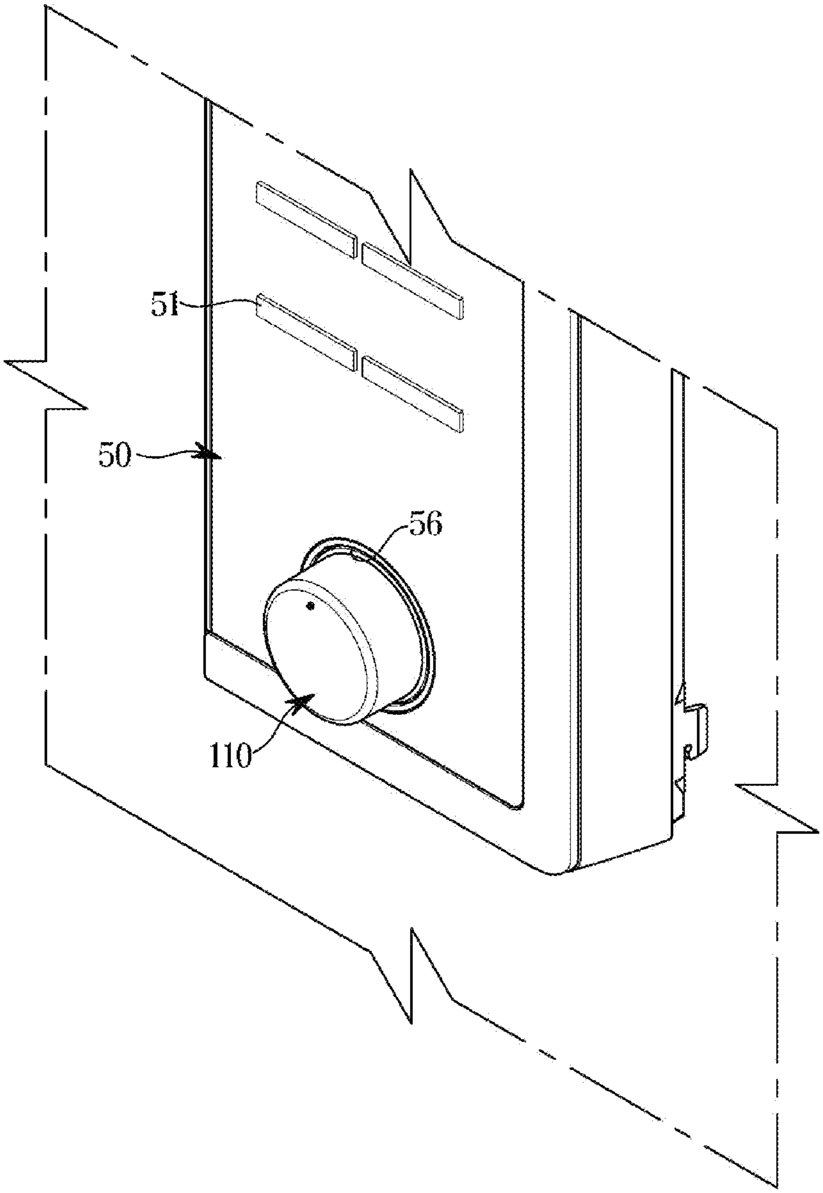
FIG. 11 illustrates an initial state of the button shown in FIG. 7 mounted in the button mounting portion.
Figure 12:
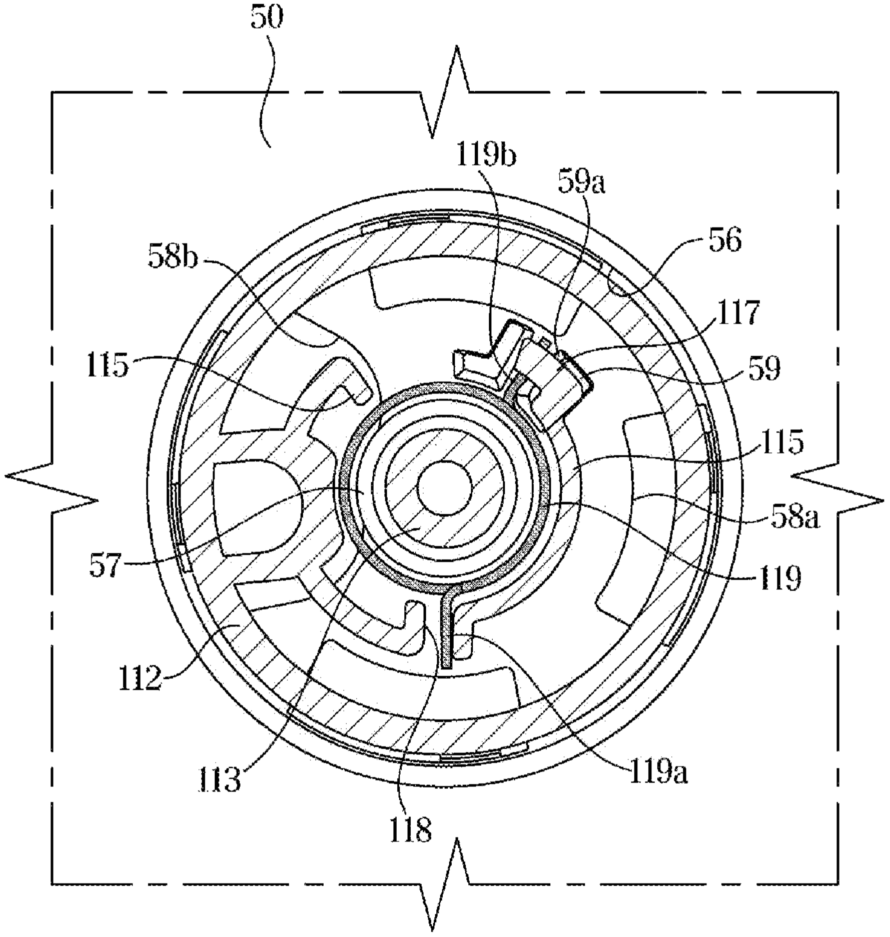
FIG. 12 illustrates an internal state of the button and the button mounting portion shown in FIG. 11, which is a state of a button interferer aligned with a panel interferer.
Figure 13:
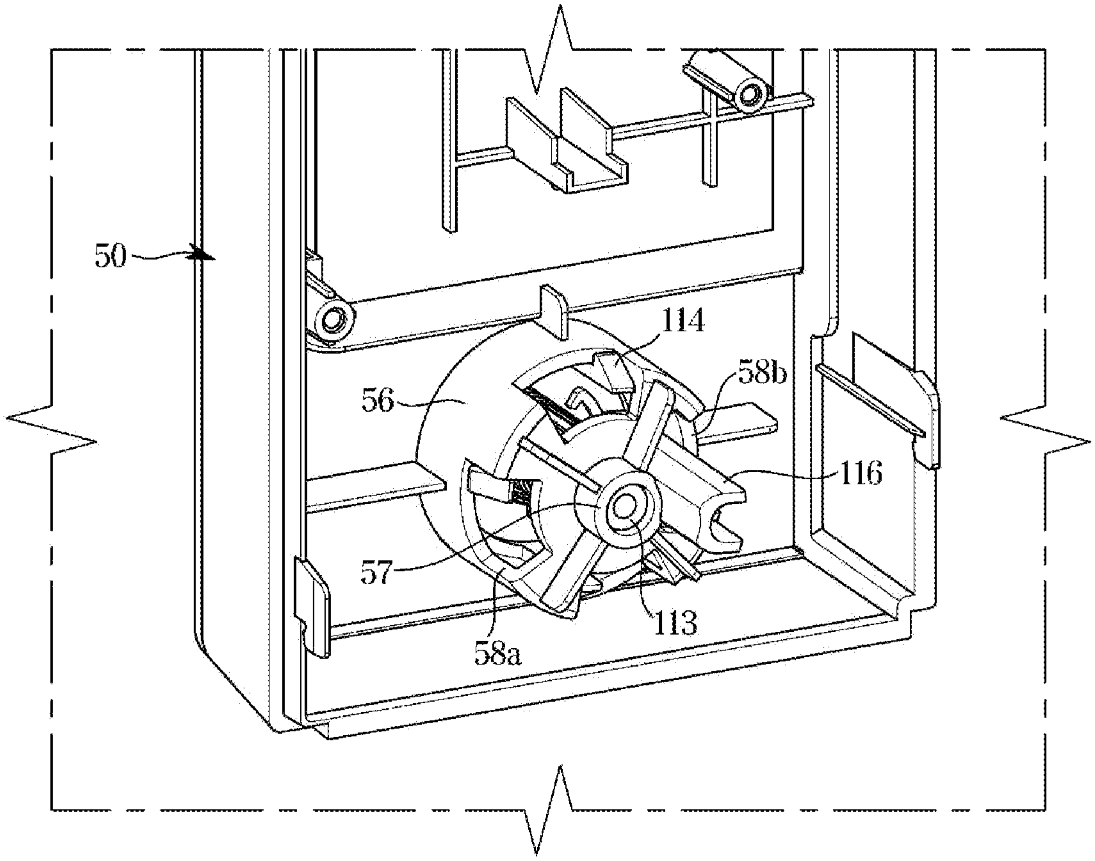
FIG. 13 illustrates the button and the button mounting portion shown in FIG. 11.
Figure 14:
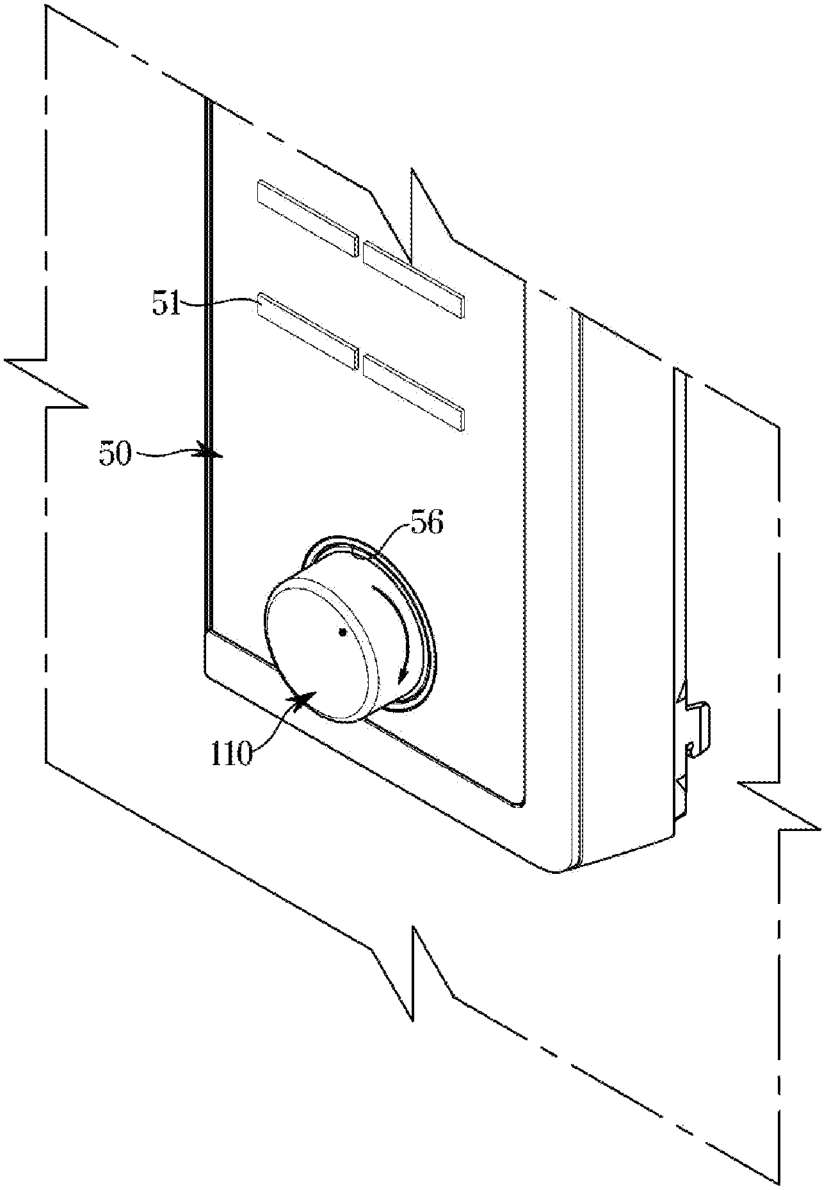
FIG. 14 illustrates a rotated state of the button shown in FIG. 11.
Figure 15:
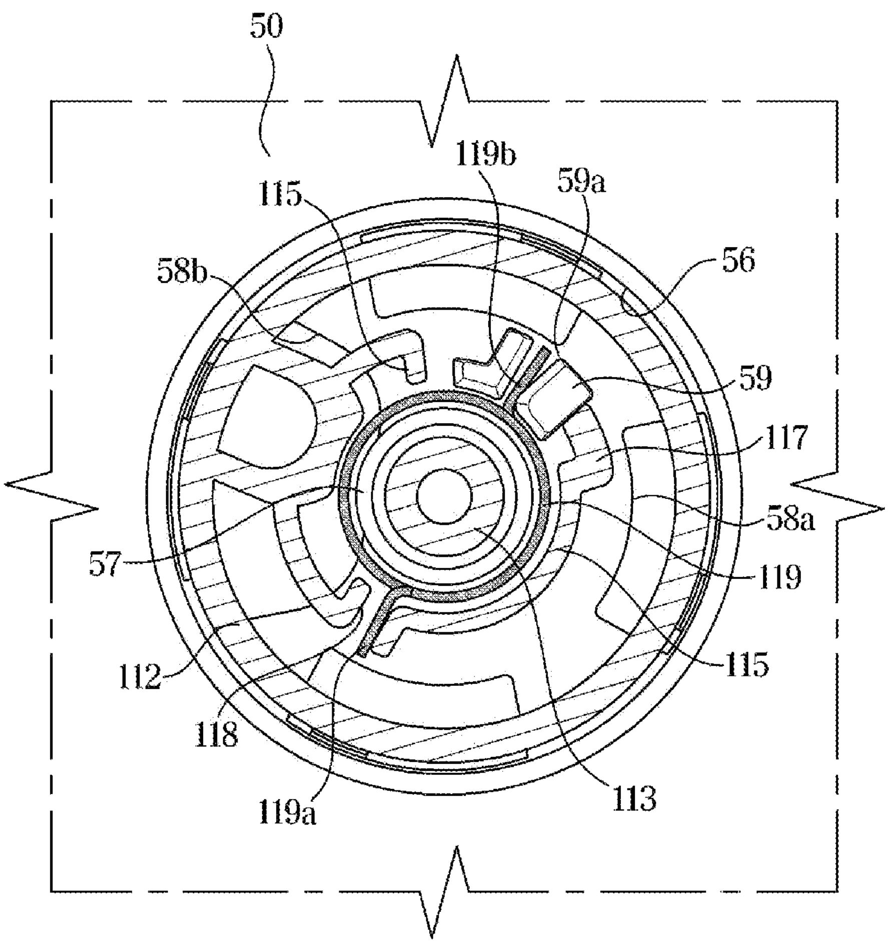
FIG. 15 illustrates an internal state of the button and the button mounting portion shown in FIG. 14, which is a state of a button interferer not aligned with a panel interferer.
Figure 16:
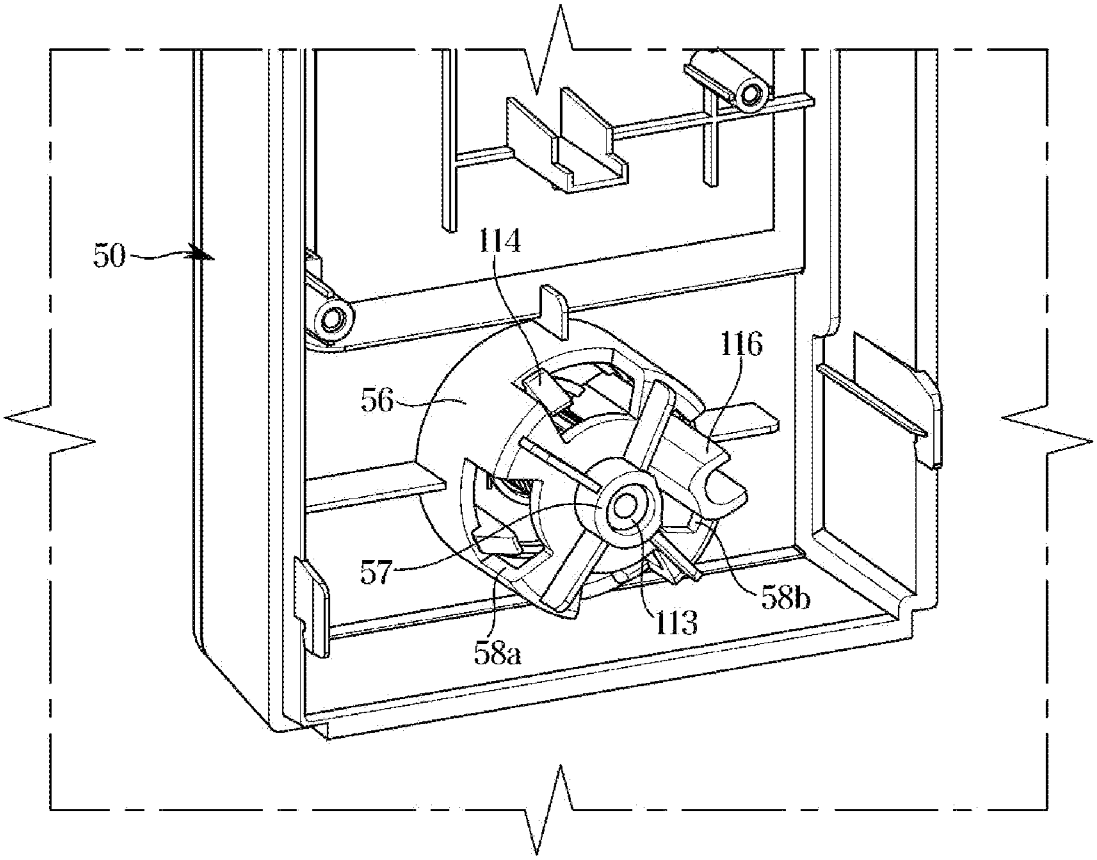
FIG. 16 illustrates the button and the button mounting portion shown in FIG. 14.
Figure 17:
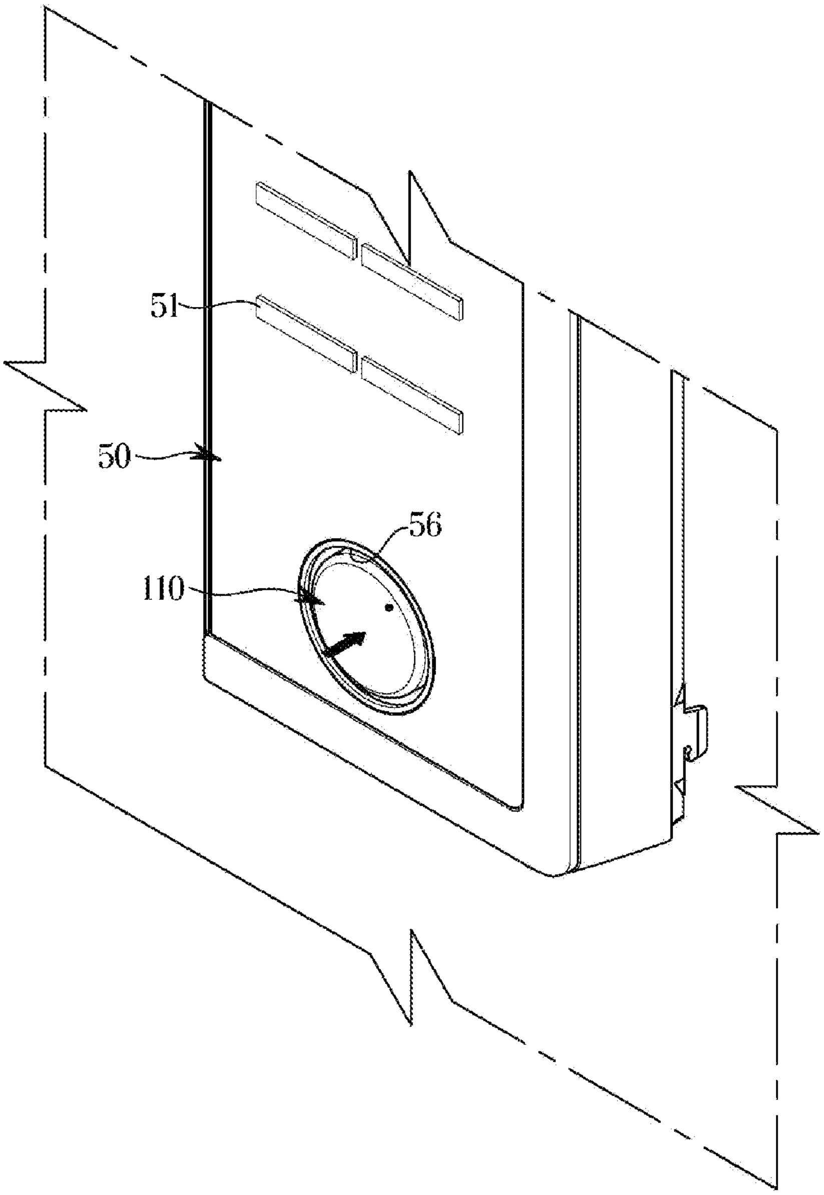
FIG. 17 illustrates a pressurized state of the button shown in FIG. 14.

FIG. 11 illustrates an initial state of the button shown in FIG. 7 mounted in the button mounting portion. FIG. 12 illustrates an internal state of the button and the button mounting portion shown in FIG. 11, which is a state of a button interferer aligns with a panel interferer. FIG. 13 illustrates the button and the button mounting portion shown in FIG. 11. FIG. 14 illustrates a rotated state of the button shown in FIG. 11. FIG. 15 illustrates an internal state of the button and the button mounting portion shown in FIG. 14, which is a state of the button interferer does not align with the panel interferer. FIG. 16 illustrates the button and the button mounting portion shown in FIG. 14. FIG. 17 illustrates a pressurized state of the button shown in FIG. 14.

Referring to FIGS. 11 to 17, a procedure in which the button 110 operates the opening and closing device 120 will be described.

Referring to FIG. 11, the button 110 may be in an initial state of not rotated. The initial state in which the button 110 is not rotated may be defined as a first position.

Referring to FIG. 12, when the button 110 is in the first position, the button interferer 117 of the button 110 may be in a position aligned with the panel interferer 59 of the control panel 50. The button 110 may not be moved into the button mounting portion 56 even when pressurized. When the button 110 is in the first position, movement of the button 110 in relation to the control panel 50 may be limited. The elastic body 119 may apply elastic force to the button 110 in a direction in which the button 110 protrudes from the button mounting portion 56. The elastic body 119 may apply torsion to the button 110 in an opposite direction from a direction in which the button 110 is rotated to a movable position into the button mounting portion 56. The elastic body 119 may apply torsion counterclockwise on the button 110 in FIG. 12.

Referring to FIG. 13, the button coupler 114 may be supported by the coupler guide 58*a* according to the torsion of the elastic body 119. The button pusher 116 may be supported by the pusher guide 58*b* according to the torsion of the elastic body 119.

Referring to FIG. 14, the button 110 may be rotated in an opposite direction from a direction of the torsion of the elastic body 119. As shown in FIG. 14, a rotated state of the button 110 from the first position may be defined as a second position. For example, the button 110 may be rotated from the first position by about 30° into the second position.

Referring to FIG. 15, as the button 110 is rotated, the button interferer 117 may be spaced apart from or not aligned with the panel interferer 59. With the rotation of the button 110, the interference state of the button interferer 117 with the panel interferer 59 may be released. When the button 110 is rotated and then pressurized, the button 110 may be linearly moved into the button mounting portion 56. The elastic body 119 may apply larger torsion to the button 110 than the torsion applied to the button 110 in a direction in which the button 110 is moved from the second position to the first position in the state as shown in FIG. 12. The elastic body 119 may be provided to apply torsion to the button 110 in a direction in which the button 110 is rotated from the second position to the first position.

Referring to FIG. 16, as the button 110 is rotated, the button coupler 114 may be moved inside the coupler guide 58*a*. With the rotation of the button 110, the button pusher 116 may be moved inside the pusher guide 58*b*.

Referring to FIG. 17, the button 110 may be moved into the button mounting portion 56 when pressurized in a rotated state to the second position. As the button 110 is moved into the button mounting portion 56, as shown in FIG. 5, the button pusher 116 of the button 110 may operate the first transfer member 121 of the opening and closing device 120. The elastic body 119 may apply larger elastic force to the button 110 than the elastic force applied to the button 110 in a direction in which the button 110 is decoupled from the control panel 50 in the state as shown in FIG. 12.

As the pressure on the button 110 is released after the button 110 operates the opening and closing device 120, the button 110 may be moved away from the button mounting portion 56 by the elastic force of the elastic body 119. As the pressure on the button 110 is released, the button 110 may be moved to the second position. With the movement of the button 110 to the second position, the button 110 may be rotated by torsion of the elastic body 119 to the first position. With the rotation of the button 110 from the second position to the first position, the button interferer 117 is moved to a position where the linear movement may be aligned with the panel interferer 59. The button coupler 114 may be supported by the coupler guide 58*a* according to the torsion of the elastic body 119. The button pusher 116 may be supported by the pusher guide 58*b* according to the torsion of the elastic body 119.

In an embodiment of the disclosure, the cooking apparatus 1 is configured to operate the opening and closing device 120 by rotating and then pressurizing the button 110, thereby increasing safety of use. The button 110 is configured to not be moved into the button mounting portion 56 even when pressurized, when in the first position before rotating, thereby preventing an accident caused by opening of the door 100 from carelessness of the user. In an embodiment of the disclosure, the cooking apparatus 1 may prevent unintentional opening of the door 100 as compared to a structure that allows linear movement of the button 110 by simple pressure without rotation.

Figure 18:
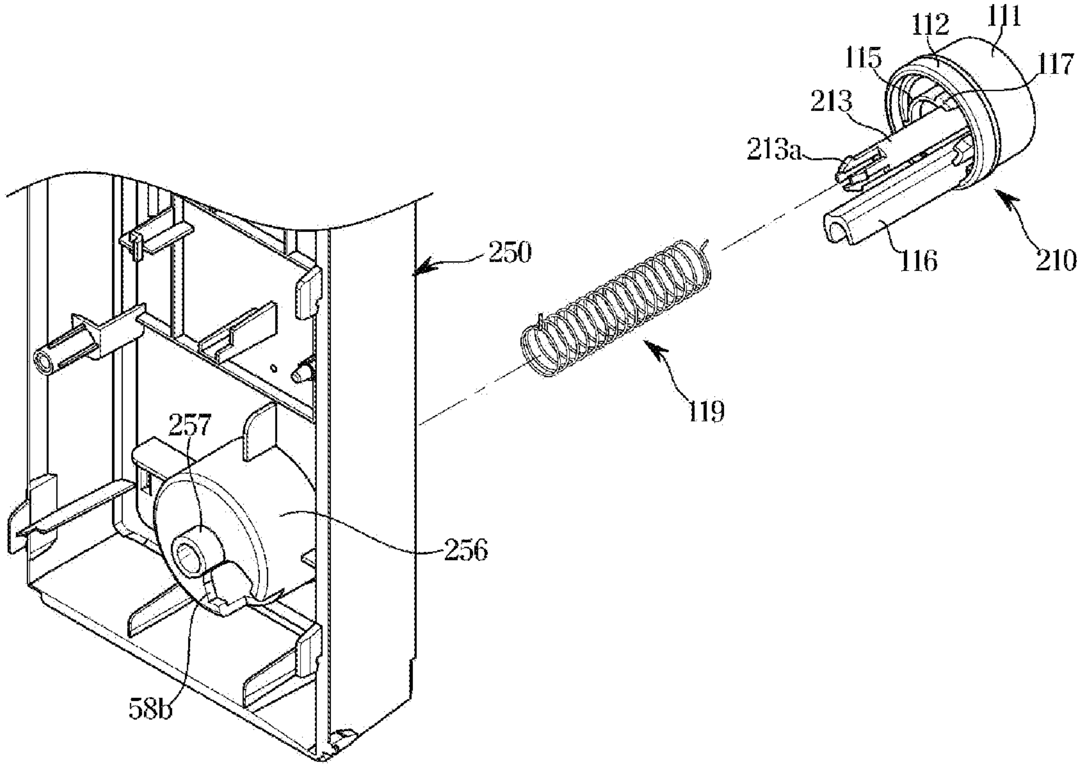
FIG. 18 illustrates a button and a control panel, according to an embodiment of the disclosure.

FIG. 18 illustrates a button and a control panel, according to an embodiment of the disclosure.

Referring to FIG. 18, a button 210 and a control panel 250 will be described. The button 210 shown in FIG. 18 may include the exposed portion 111, button body 112, elastic body guide 115, button pusher 116, button interferer 117 and button fixer 118 of the button 110 as shown in FIG. 8. The control panel 250 shown in FIG. 18 may include the pusher guide 58*b*, panel interferer 59 and panel fixer 59*a* of the control panel 50 as shown in FIG. 10. The button 210 may be elastically supported by the control panel 250 through the elastic body 119.

Referring to FIG. 18, the button 210 may include a button spindle 213. The button spindle 213 may be rotationally coupled with a spindle support 257 of the control panel 250. As the button spindle 213 is rotationally coupled with the spindle support 257, the button 210 may be rotated when mounted in a button mounting portion 256 of the control panel 250. The button spindle 213 may be movably coupled with the spindle support 257 of the control panel 250. As the button spindle 213 is movably coupled with the spindle support 257, the button 210 may be linearly moved when mounted in the button mounting portion 256 of the control panel 250.

The button 210 may include a button coupler 213*a* arranged at an end of the button spindle 213. The button coupler 213*a* may have a substantially hook shape. The button coupler 213*a* may include an elastically deformable material. The button coupler 213*a* may be deformed while the button spindle 213 is coupled with the spindle support 257. The button coupler 213*a* may be restored by elasticity when the button spindle 213 is mounted on the spindle support 257. The button 210 may be separated from the control panel 250 by deforming the button coupler 213*a*. The button coupler 213*a* may be supported by the spindle support 257 to prevent the button 110 from leaving the button mounting portion 256 when the button spindle 213 is mounted on the spindle support 257.

In the button 210 shown in FIG. 18, the button coupler 114 of the button 110 as shown in FIG. 8 may be arranged on the button rotational axis. The control panel 250 shown in FIG. 18 may not include the coupler guide 58*a* of the control panel 50 as shown in FIG. 10. A rotation range of the button 210 shown in FIG. 18 may be limited by the pusher guide 58*b*.

Figure 19:
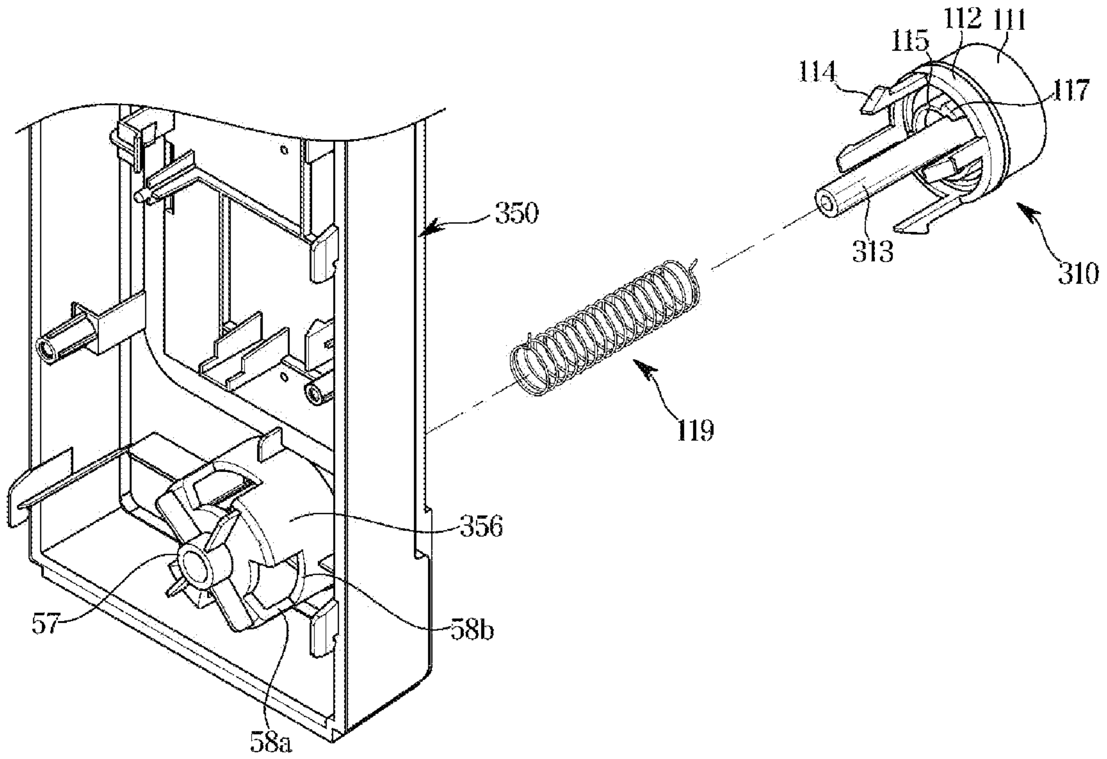
FIG. 19 illustrates a button and a control panel, according to an embodiment of the disclosure.

FIG. 19 illustrates a button and a control panel, according to an embodiment of the disclosure.

Referring to FIG. 19, a button 310 and a control panel 350 will be described. The button 310 shown in FIG. 19 may include the exposed portion 111, button body 112, button coupler 114, elastic body guide 115, button interferer 117 and button fixer 118 of the button 110 as shown in FIG. 8. The control panel 350 shown in FIG. 19 may include the spindle support 57, panel interferer 59 and panel fixer 59*a* of the control panel 50 as shown in FIG. 10. The button 310 may be elastically supported by the control panel 350 through the elastic body 119.

Referring to FIG. 19, the button 310 may include a button spindle 313. The button spindle 313 may be rotationally coupled with the spindle support 57 of the control panel 350. As the button spindle 313 is rotationally coupled with the spindle support 57, the button 310 may be rotated when mounted in a button mounting portion 356 of the control panel 350. The button spindle 313 may be movably coupled with the spindle support 57 of the control panel 350. As the button spindle 313 is movably coupled with the spindle support 57, the button 310 may be linearly moved when mounted in the button mounting portion 356 of the control panel 350.

The button spindle 313 may be provided to operate the opening and closing device 120 shown in FIGS. 3 to 5. The button spindle 313 shown in FIG. 19 may extend from the button body 112 to be longer than the button spindle 113 shown in FIG. 8 does. As the button spindle 113 is provided to operate the opening and closing device 120, the button shown in FIG. 19 may not include the button pusher 116 of the button 110 as shown in FIG. 8.

Several embodiments of the disclosure have been described above, but a person of ordinary skill in the art will understand and appreciate that various modifications can be made without departing from the scope of the disclosure. Thus, it will be apparent to those or ordinary skill in the art that the true scope of technical protection is only defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:

a main body forming a cooking chamber and including a control panel;

a door configured to open and close the cooking chamber;

an opening and closing device configured to lock and unlock the door in response to the door closing the cooking chamber; and a button rotatably coupled along a rotation axis with the control panel to be rotated to a first position and a second position different from the first position, wherein the button is unpushable in a direction parallel to the rotation axis in the first position, and pushable in the direction parallel to the rotation axis to operate the opening and closing device in the second position.

2. The cooking apparatus of claim 1, further comprising:

an elastic body configured to apply torsion to the button in a rotational direction in which the button is rotated from the second position to the first position.

3. The cooking apparatus of claim 2, wherein the elastic body is configured to apply an elastic force to the button in a movable direction in which the button protrudes from the control panel.

4. The cooking apparatus of claim 2, wherein:

the button comprises a button fixer configured to fix a first end of the elastic body, and the control panel comprises a panel fixer configured to fix a second end opposite from the first end of the elastic body.

5. The cooking apparatus of claim 2, wherein the button comprises an elastic body guide configured to support at least a portion of the elastic body to prevent the elastic body from extending outside of the button while the elastic body is pressurized and restored.

6. The cooking apparatus of claim 2, wherein the control panel comprises a spindle support rotatably and movably coupled with a button spindle of the button, the spindle support configured to support at least a portion of the elastic body to prevent the elastic body from extending outside of the control panel while the elastic body is pressurized and restored.

7. The cooking apparatus of claim 1, wherein:

the control panel comprises a panel interferer protruding toward the button, and the button comprises a button interferer configured to align with the panel interferer in response to the button rotating to the first position, and not align with the panel interferer in response to the button rotating to the second position.

8. The cooking apparatus of claim 1, wherein:

the button comprises:

a button spindle forming a rotational axis of the button, and a button pusher spaced apart from the button spindle and configured to push the opening and closing device, and the control panel comprises a pusher guide configured to guide movement of the button pusher caused by rotation of the button.

9. The cooking apparatus of claim 8, wherein the pusher guide is configured to support the button pusher in response to the button rotating to the first position.

10. The cooking apparatus of claim 8, wherein the pusher guide is configured to interfere with the button pusher to limit rotation of the button in a direction opposite from a direction toward the first position from the second position.

11. The cooking apparatus of claim 1, wherein:

the button comprises a button coupler supported on the control panel to limit movement of the button mounted on the control panel in a movable direction in which the button protrudes from the control panel, and the control panel comprises a coupler guide configured to guide movement of the button coupler caused by rotation of the button.

12. The cooking apparatus of claim 11, wherein the coupler guide is configured to support the button coupler in response to the button rotating to the first position.

13. The cooking apparatus of claim 11, wherein the coupler guide is configured to interfere with the button coupler to limit rotation of the button in a direction opposite from a direction toward the first position from the second position.

14. The cooking apparatus of claim 1, wherein:

the control panel comprises a button mounting portion formed for the button to be mounted thereon, and the button comprises:

a button body arranged inside the button mounting portion; and an exposed portion positioned inside or outside the button mounting portion and having a cross-section orthogonal to a movable direction of the button smaller than a cross-section of the button body orthogonal to the movable direction of the button.

15. The cooking apparatus of claim 1, wherein the button comprises a button spindle forming a rotational axis of the button and configured to push the opening and closing device.

* * * * *